Nov. 2, 1948.  R. B. BOURNE ET AL  2,452,723
SPARK ARRESTER SILENCER

Filed May 4, 1945  4 Sheets-Sheet 1

INVENTORS
ROLAND B. BOURNE
JOHN B. TYSKEWICZ AND
ARTHUR E CHASE
BY
Chapin & Neal
ATTORNEYS Nov. 2, 1948. R. B. BOURNE ET AL 2,452,723
SPARK ARRESTER SILENCER
Filed May 4, 1945 4 Sheets-Sheet 2
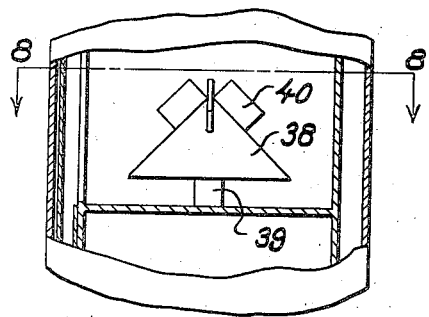
Fig.7
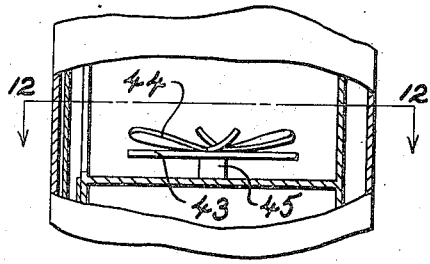
Fig.11
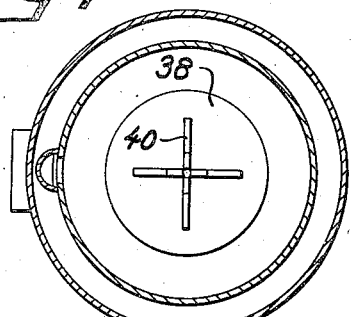
Fig.8
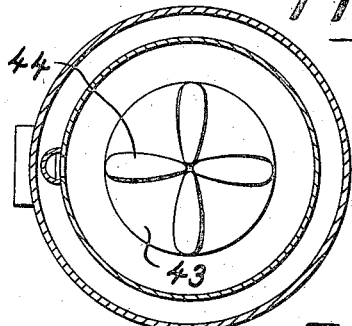
Fig.12
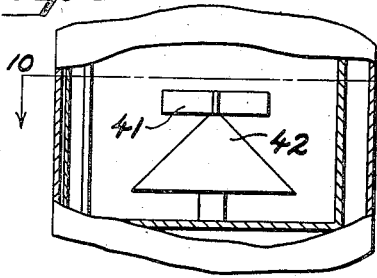
Fig.9
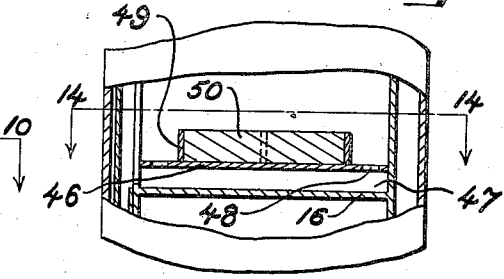
Fig.13
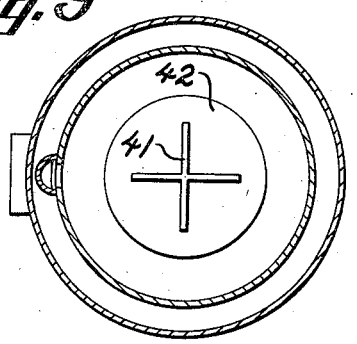
Fig.10
Fig.14
INVENTORS
ROLAND B. BOURNE
JOHN P. TYSKEWICZ AND
ARTHUR E. CHASE
BY
Chapin & Neal
ATTORNEYS INVENTORS
ROLAND B. BOURNE
JOHN P. TYSKEWICZ AND
ARTHUR E. CHASE
BY
Chapin & Neal
ATTORNEYS

INVENTORS
ROLAND B. BOURNE
JOHN P. TYSKEWICZ AND
ARTHUR E. CHASE

Patented Nov. 2, 1948

2,452,723

UNITED STATES PATENT OFFICE 2,452,723

SPARK ARRESTER SILENCER

Roland B. Bourne, West Hartford, John P. Tyskewicz, Hartford, and Arthur E. Chase, Elmwood, Conn., assignors to The Maxim Silencer Company, Hartford, Conn., a corporation of Connecticut Application May 4, 1945, Serial No. 591,958

3 Claims. (Cl. 183—94)

1

The present invention pertains to devices for silencing the exhaust noise of internal combustion engines and the like, and at the same time removing from the exhaust gas entrained dirt, sparks and the like. In some forms of exhaust silencers and cleaners, it is customary to introduce the exhaust gases into a dirt separating and silencing chamber with a whirling motion whereby the solid material is thrown by centrifugal force to the sides of the whirl chamber where it is collected and removed. It has been common practice to provide the inner end of the conduit, through which the gases are discharged from the whirl chamber, with a conical mouth for funneling the whirling gases into the discharged conduit. For an example of a construction involving such a conical mouth, reference is made to the Bourne Patent 2,265,343, issued December 9, 1941. In that patent the gases enter the whirl chamber through a number of bent tubes so arranged as to impart the desired whirling motion to the gases as they enter the bottom of the chamber. For purposes of reducing back pressure, a number of longitudinally disposed vanes are provided extending from the large to the small end of the cone.

In the preferred form of the present invention the exhaust gases enter from the top of the whirl chamber rather than from the bottom as disclosed in the aforementioned patent. While the vanes shown in that patent and in the copending patent of John P. Tyskewicz, 2,413,086, granted December 24, 1946, both show a marked reduction in back pressure when used in spark arrester silencers of the type employing whirling gas in a chamber having a coaxial outlet, we have found that it is possible to reduce the back pressure still further by constructions of an even greater efficiency than those used in either of the aforementioned disclosures. According to the present invention, these novel anti-whirl constructions are disposed in the interior of the dirt separating chamber rather than in the outlet conduit in a manner to be described. While such constructions lend themselves particularly well for use in whirl chambers having a retrograde, whirling gas flow, they may also be used in spark arresters of this type shown in U. S. Patent No. 2,265,343. Another type of spark arrester silencer with which the present invention may be associated is shown in U. S. Patent No. 2,075,264, issued March 30, 1937, to Bourne and Maxim. In this latter patent, the gases assume a retrograde whirling path through the spark arrester portion and the anti-whirl constructions are preferably positioned in the space defined by the inside of the conical hopper therein shown.

In the accompanying drawings,

Fig. 1 is a longitudinal cross section of a spark arrester silencer embodying one form of the invention;

2

Figs. 3, 5, 7, 9, 11, 13, 15, 17 and 19 are side views, partly broken away of other anti-whirling constructions embodying the principles of the invention;

Figs. 4, 6, 8, 10, 12, 14, 16, 18 and 20 are plan views of the anti-whirling constructions shown respectively in Figs. 3, 5, 7, 9, 11, 13, 15, 17 and 19;

Figure 1:
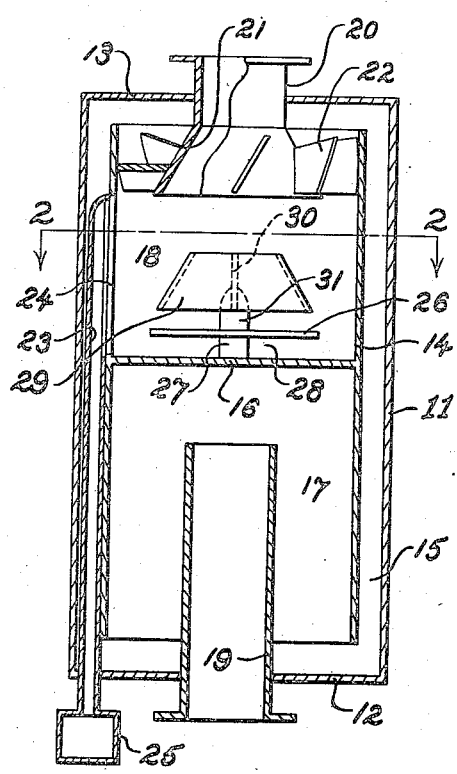
Figure 2:
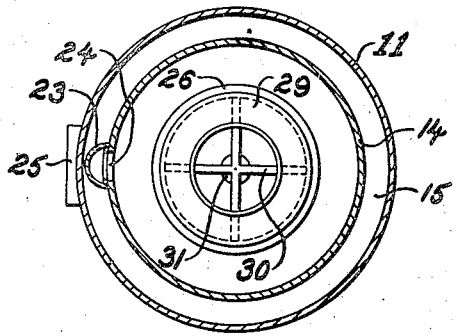
Fig. 2 is a section taken on line 2—2 of Fig. 1.

Referring to Figs. 1 and 2, the spark arrester silencer comprises a generally cylindrical casing 11, having an inlet header 12 and an outlet header 13. Also mounted within the casing 11 is an inner cylindrical shell 14, open at both ends, of smaller diameter than the casing 11, and extending from a point near the inlet header 12 to a point near the outlet header 13 to form an annular passage 15. The cylindrical shell 14 may be supported by suitable brackets, not shown. The shell 14 is fitted with a transverse header 16 dividing the interior of the device into an inlet chamber 17 and an outlet chamber 18. The inlet conduit 19 extends through the header 12 to a point preferably about one pipe diameter away from the header 16. An outlet conduit 20 extends through the header 13 into the outlet chamber 18 and has its interior end flared to form a conical outlet member 21. The space between the outside of member 21 and the shell 14 is fitted with a plurality of angularly disposed vanes 22 the purpose of which is to impart a whirling motion to the downwardly passing dirt-bearing exhaust gas. The exhaust gas enters the device through the inlet conduit 19, reverses its direction in the chamber 17, passes upwardly through the annular channel 15 and downwardly through the vane structure into the whirl chamber 18, and thence passes out through the conical member 21 and outlet pipe 20. Entrained dirt in the exhaust gas is thrown to the outside of the chamber 18, where it is collected by a tubular member 23 through suitable openings 24 in the shell 14 and is conducted downwardly to the dirt box 25.

We have found that the back pressure on devices of this type is materially reduced by disposing near the bottom of the whirl chamber certain constructions which comprise one or more anti-whirl vanes spaced above the transverse partition 16 or other floor of the chamber in such a manner that the whirling dirt-bearing gases do not have access to these vanes until after any entrained dirt is thrown out. In all of the constructions shown, a space is provided contiguous with the bottom of the whirl chamber wherein the vigorously whirling dirt is free to circulate until caught by the collector 23. Positioning the vanes immediately on the floor of the whirl chamber will expose them directly to the whirl in the bottom of the chamber 18, and while the required reduction in back pressure will be produced the device will be rendered inefficient as a dirt separator. It is a feature of the present invention that the anti-whirl vanes are not in contact with the exhaust gases until the entrained dirt is separated out.

While the exact action of these constructions is not too well understood, it appears that their successful operation is due to their converting the peripherally whirling body of the gases in the lower portion of the chamber 18 into a relatively non-whirling upwardly directed column or jet passing back through the axial portion of the chamber. Measurements taken show that, other things being equal, the lowest back pressure consistent with efficient dirt separation is attained when the pressure, and therefore the velocity, in the upward column is substantially uniform throughout its cross sectional area.

The construction shown in Figs. 1 and 2 shows an elevated baffle or plate 26 supported by a post 27 on the header 16, thus forming an unobstructed space 28 between said plate and the header. Mounted co-axially with and spaced above the circular plate 26 is a conical member 29 open at both its upper and lower ends and fitted with two crossed vanes 30. The cone 29 and vanes 30 are supported by a post 31, which may be an extension of the post 27.

In operation, the downwardly whirling dirt-bearing exhaust gas, which has entered through the conico-annular passage containing the vanes 22, passes downwardly through the chamber 18 and then reverses its direction and passes upwardly through the central portion of that chamber. The dirt is thrown out by centrifugal force against the inner wall of the shell 14, some of it passing through aperture 24 and a certain percentage of it finding its way down to the region of the partition 16 where it is free to whirl in the space 28 until picked up by the collector 23. Clean gas is peeled off the inside portion of the whirling stream and a substantial portion of it passes between the bottom of the cone 29 and the top surface of the plate 26 and flows upwardly through the cone 28 with its whirling motion substantially reduced by the vanes 29. Additional gas is peeled off from the whirl by the ascending column and passes upwardly to the outlet cone 21 in admixture with the non-whirling gases emerging from the cone 28. The gases may have a certain amount of whirl as they leave the silencer. The degree of residual whirl permissible in order to produce the desired results appears to be a compromise between the amount of work necessary to completely stop the whirl inside the chamber 18 and the amount of work which would be required for forcing the whirling gases out of a silencer in which no anti-whirl construction was employed. The construction shown on Figs. 1 and 2 is considered a preferred embodiment of the invention.

In certain of the remaining drawings we have dispensed with showing a complete spark arresting silencer and have limited ourselves to that portion of the inner shell 14 and the floor 16 of the whirl chamber, since this will be adequate to show the various embodiments of the invention to be hereinafter disclosed.

Figure 3:
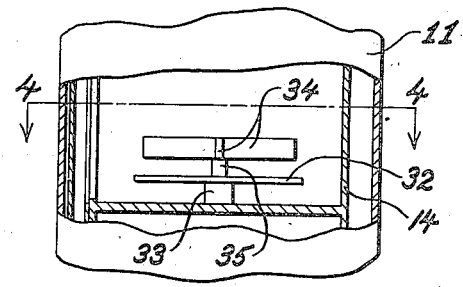
Figure 4:
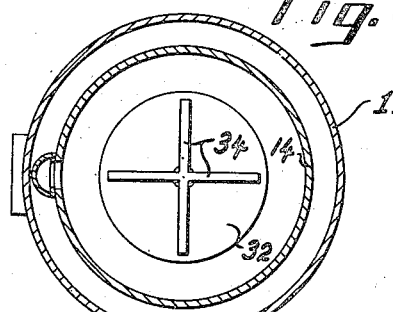

Figs. 3 and 4 show an anti-whirl construction comprising a circular plate 32 affixed to and supported somewhat above the floor 16 by a post 33. Positioned above and spaced a short distance away from the plate 32 are cross vanes 34 supported in any convenient manner as by the pillar 35. This construction in some respects is similar to that shown in Fig. 1 and the action is substantially the same.

Figure 5:
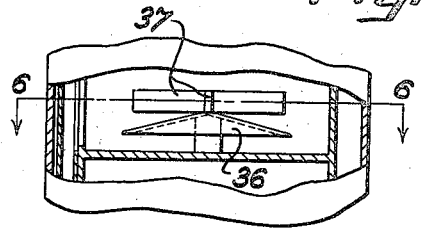
Figure 6:
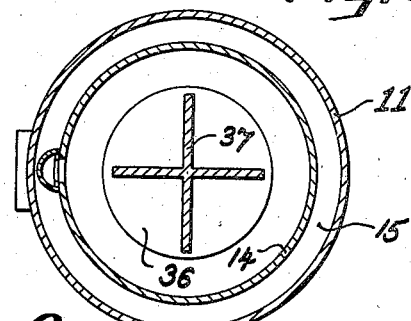

Figs. 5 and 6 show a construction similar to that of Fig. 3 wherein the raised plate 36 is made in the shape of a flat cone with crossed vanes 37 affixed to the apex thereof.

Figs. 7 and 8 disclose an embodiment of the invention wherein the raised plate 38 is in the form of a 90 degree cone supported on and above the transverse header 16 by the cylindrical pillar 39 as shown. The anti-whirl vanes 40 are mounted directly on the outside face of the cone 38.

Figs. 9 and 10 show a construction similar to that of Figs. 7 and 8 excepting that the vanes 41 are affixed to the cone 42 at its apex only.

Figs. 11 and 12 show a raised circular plate 43 having four blade-like vanes 44 inclined upwardly at such an angle that they are affixed to the plate 43 at the inner ends only, thus leaving a space 45 between the outer ends of the vanes 44 and the top of the plate 43. The plates are furthermore pitched with respect to the direction of whirl so that the gases are directed upwardly without undue turbulence.

Figs. 13 and 14 show a modification wherein an auxiliary transverse header 46 is positioned completely across the bottom end of the whirl chamber 18 and is spaced vertically from the partition 16 so as to form an auxiliary dead end whirl chamber 47, access to which is gained through a plurality of apertures 48 in the header 46, in adjacency to the shell 14. Mounted on the header 46 is a short axially disposed cylindrical member 49 containing crossed vanes 50. While these vanes would not appear to be directly exposed to the whirling gases, their effect appears to extend up into the central portion of the chamber 18 and accomplishes the desired results.

Figure 15:
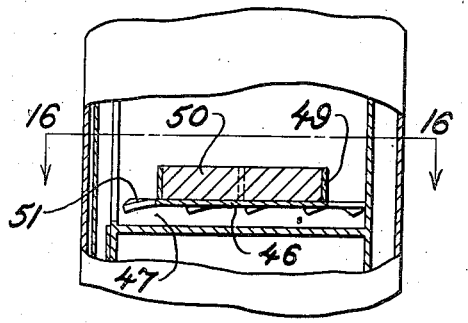
Figure 16:
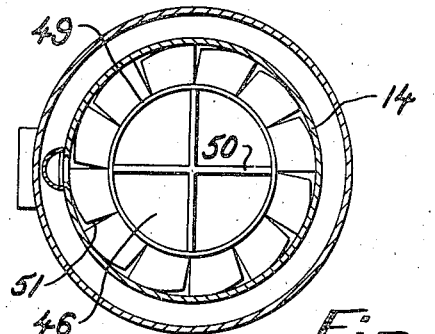

Figs. 15 and 16 show an embodiment similar to that of Figs. 13 and 14, the difference being that the apertures 48 are replaced by pitched slot like openings 51, thus making it easier for the dirt particles to reach the dead end space 47.

Figure 17:
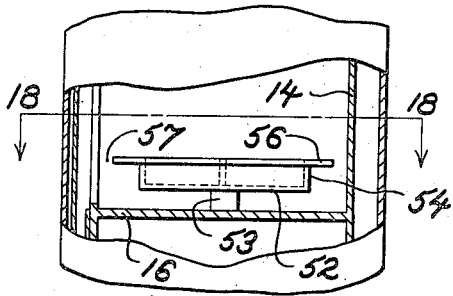
Figure 18:
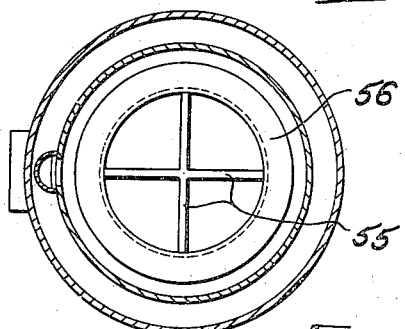

Figs. 17 and 18 show still another embodiment comprising a raised plate 52 supported on and above the floor 16 by the pillar 53. A short cylindrical member 54 extends upwardly from the rim of the plate 52 and encloses anti-whirl vanes 55 as shown. From the top edge of the cylindrical member 54 there extends an annular flat ring 56 to a region adjacent to the inner wall of the shell 14, leaving an annular slot 57 through which the downwardly whirling exhaust gas and dirt are free to enter.

Figure 19:
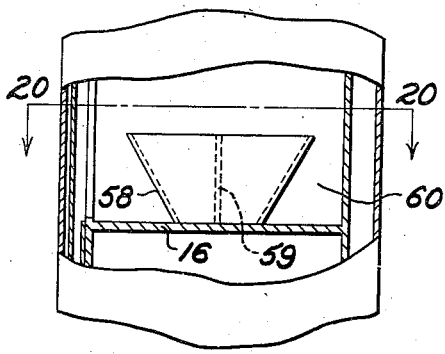
Figure 20:
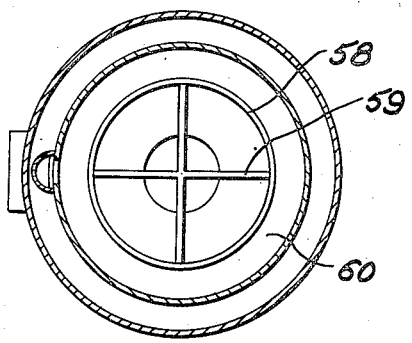

Figs. 19 and 20 show still a further construction comprising an inverted truncated conical member 58 affixed directly to the transverse header 16 and containing the cross vanes 59. It will be seen that this construction leaves a conico-annular space 60 wherein the dirt bearing gases may freely whirl. As is the case in the embodiment shown in Figs. 13 to 18 inclusive, the presence of the vanes 59, even though they are not disposed directly in the gas stream, affects the flow in the chamber 18 in the desired manner.

This is a cheap and simple structure and is inherently rigid.

While we have shown a particular spark arresting silencer to which the various constructions shown are well adapted and which has been described in detail above, the invention is by no means limited to spark arresters of this exact type. What is germane to the invention is that the anti-whirl constructions disclosed are positioned in a dirt separating chamber at a point removed from the central outlet connection, whether this is at the top, as in the case of a vertically mounted installation or whether the silencer is installed on its side, the outlet then being centrally disposed at one end of the device. In some cases the action of the anti-whirl vanes is so marked as to preclude the necessity of using the conical flared outlet connection. This is of course an advantage, since the use of widely flared outlet connections generally results in a lesser degree of noise attenuation.

Figure 21:
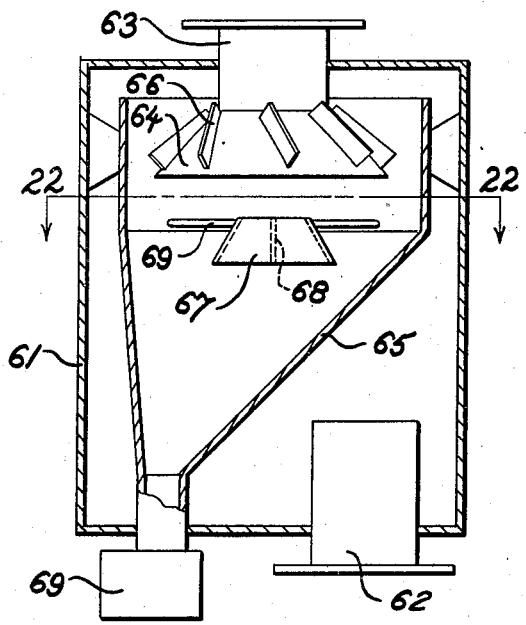
Fig. 21 shows a construction in accordance with the present invention applied to a spark arrester silencer having a conico-cylindrical dirt separating chamber.
Figure 22:
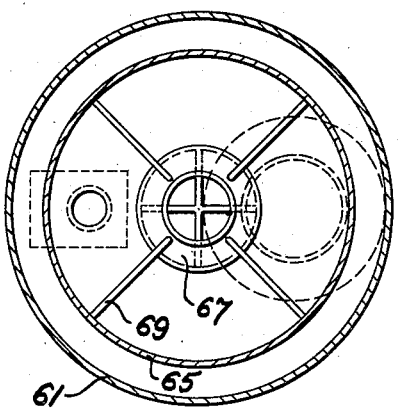
Fig. 22 is a section on line 22—22 of Fig. 21.

Referring to Figs. 21 and 22, this dirt separating silencer comprises a cylindrical casing 61, a bottom inlet connection 62, an upper centrally disposed outlet connection 63, having a conical flare 64, and an interiorly disposed conico-cylindrical hopper 65. The spinner vanes 66 are located between the casing 61 and the cylindrical part of the hopper 65. Disposed in the interior space of the hopper 65 is an anti-whirl construction comprising an open ended truncated conical member 67 fitted with crossed vanes 68 and supported as by struts 69. The downwardly whirling gases reverse their flow at about this point, some of said gases passing upwardly through the conical member 67 and the remainder being peeled off the whirling stream just above it. On account of the deep recess behind the member 67, no plate is needed in this embodiment such as was shown in Fig. 1. The rejected dirt travels downwardly into the dirt box 69. The action is substantially the same as described hereinbefore.

Figure 23:
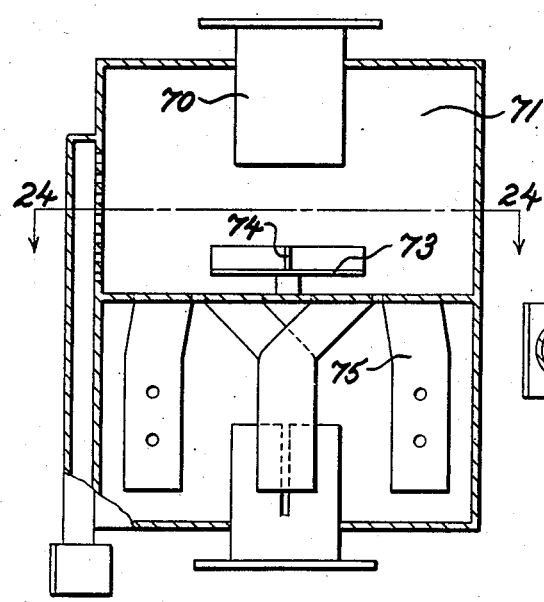
Fig. 23 shows another construction in accordance with the present invention applied to a spark arrester silencer of the type shown in the patent to Bourne No. 2,265,343.
Figure 24:
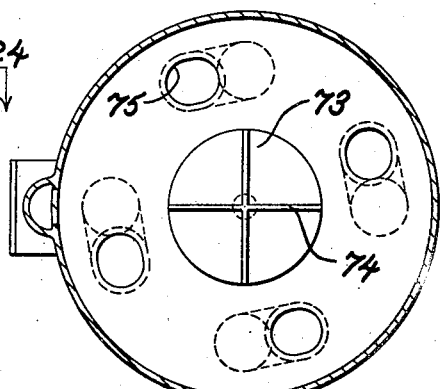
Fig. 24 is a cross section on line 24, 24 of Fig. 23.

Figs. 23 and 24 show a spark arrester silencer of the type disclosed in the Bourne Patent No. 2,265,343 except that the outlet conduit 70 is of uniform cross sectional area and projects into the separating chamber 71. The anti-whirl construction, consisting of an elevated plate 73 with vanes 74 on its upper surface, is positioned as shown, the diameter of the construction being such that it does not overlap the four entrance conduits 75. In this case there may be no dirt whirling about under the plate 73, yet the action of the plate and its associated vanes on the inner core of the whirling gases is such as to materially reduce the back pressure.

It is not to be inferred that the constructions shown in connection with Figs. 1, 21 and 23 are the only ones to which the invention is adapted. The two shown were chosen as typical and the others were omitted in the interests of simplicity. While we have not shown all of the constructions possible, the aforementioned embodiments disclose the important features of the invention.

In the matter of dimensions, the raised plate, or its equivalent, is preferably positioned away from the transverse header a distance equal to from $\frac{1}{5}$ to $\frac{1}{10}$ the inside diameter of the inner shell 14. The diameter of the raised plate is such as to leave a gap between it and the shell 14 about equal to the distance said plate is positioned above the floor 16. The longitudinal height of the anti-whirl vanes may vary from $\frac{1}{10}$ to $\frac{1}{4}$ the inside diameter of the whirl chamber. In the embodiment shown in Figs. 1 and 2, the small diameter of the truncated cone is of the order of the diameter of the outlet conduit itself. The large or bottom diameter is about half that of the chamber 18. It is not possible to give exact dimensions for all types or sizes of silencers, since the shape and size of the chambers may vary considerably depending on the particular design to which the principles of the invention are applied. In none of the constructions shown are there any vanes positioned in the outlet cone 21 shown in Figs. 1 and 2. With the proper portion of the anti-whirl devices in the bottom of the chamber 18, presence of vanes in the outlet construction yields no further advantage.

We claim:

1. A construction for reducing the back pressure of a substantially cylindrical chamber of the type in which the gas is introduced into the chamber in a direction so that the gas has a whirling motion in the chamber and is removed from the chamber through a coaxial outlet, comprising a baffle spaced from the end of the chamber opposite the outlet, an open ended frustum of a cone positioned between the baffle and the inner end of the outlet, and one or more whirl breaking vanes within the cone.

2. A construction for reducing the back pressure of a substantially cylindrical chamber of the type in which the gas is introduced into the chamber in a direction so that the gas has a whirling motion in the chamber and is removed from the chamber through a coaxial outlet, comprising a plate spaced from the end of the chamber remote from the outlet and affording a space for dirt to pass adjacent the cylindrical wall of the chamber, a housing affixed to the plate and having an open end spaced from the outlet, and one or more whirl breaking vanes within said housing.

3. A construction for reducing the back pressure of a substantially cylindrical chamber of the type in which the gas is introduced into the chamber in a direction so that the gas has a whirling motion in the chamber and is removed from the chamber through a coaxial outlet, comprising a frustum of a cone affixed to the end of the chamber remote from the outlet and having an open end spaced from the outlet, and one or more whirl breaking vanes within the cone, said cone being of less maximum diameter than the chamber.

ROLAND B. BOURNE.
JOHN P. TYSKEWICZ.
ARTHUR E. CHASE.

REFERENCES CITED

The following references are of record in the file of this patent:

UNITED STATES PATENTS

| Number | Name | Date |
| --- | --- | --- |
| 398,788 | Mundy | Feb. 26, 1889 |
| 1,742,564 | Summers | Jan. 7, 1930 |
| 1,871,384 | Miller | Aug. 9, 1932 |
| 2,106,589 | Bigger et al. | Jan. 25, 1938 |
| 2,265,343 | Bourne | Dec. 9, 1941 |
| 2,392,872 | Wolfe | Jan. 15, 1946 |

FOREIGN PATENTS

| Number | Country | Date |
| --- | --- | --- |
| 11,600 | Great Britain | July 20, 1889 |